United States Patent
Kimmel et al.

(10) Patent No.: US 6,639,787 B2
(45) Date of Patent: Oct. 28, 2003

(54) MODIFIED OXYGEN REDUCED VALVE METAL OXIDES

(75) Inventors: Jonathon L. Kimmel, Audubon, PA (US); Randall V. Redd, Phoenixville, PA (US)

(73) Assignee: Cabot Corporation, Boston, MA (US)

(*) Notice: Subject to any disclaimer, the term of this patent is extended or adjusted under 35 U.S.C. 154(b) by 0 days.

(21) Appl. No.: 10/012,187

(22) Filed: Nov. 6, 2001

(65) Prior Publication Data

US 2002/0172861 A1 Nov. 21, 2002

Related U.S. Application Data

(60) Provisional application No. 60/246,042, filed on Nov. 6, 2000.

(51) Int. Cl.[7] .................................. H01G 9/04
(52) U.S. Cl. .................. 361/508; 361/528; 419/10; 419/19; 419/30; 419/35; 419/38; 419/39; 419/65; 419/66; 75/228; 75/229; 75/232; 75/245; 428/472; 428/702; 423/592.1; 423/594.17; 29/25.03
(58) Field of Search .................. 361/528, 508; 419/10, 19, 30, 35, 38, 39, 65, 66; 75/228, 229, 232, 245; 428/472, 702; 423/592.1, 594.17; 29/25.03

(56) References Cited

U.S. PATENT DOCUMENTS

| | | |
|---|---|---|
| 1,415,516 A | 9/1922 | Bridge .................. 75/614 |
| 1,906,184 A | 4/1933 | Bohn et al. |
| 2,183,517 A | 12/1939 | Lemanns et al. |
| 2,242,759 A | 5/1941 | Schlect et al. .................. 75/395 |
| 2,443,254 A | 6/1948 | Kroll et al. .................. 423/62 |
| 2,621,137 A | 12/1952 | Miller .................. 148/13.1 |
| 2,700,606 A | 1/1955 | Wilhelm et al. .................. 75/84 |
| 2,761,776 A | 9/1956 | Bichowsky .................. 75/5 |
| 2,861,882 A | 11/1958 | Bichowsky .................. 75/84 |
| 2,937,939 A | 5/1960 | Wilhelm et al. .................. 75/84 |
| 2,992,095 A | 7/1961 | Li .................. 75/27 |
| 3,418,106 A | 12/1968 | Piettet .................. 75/0.5 |
| 3,421,195 A | 1/1969 | Berryhill .................. 29/25.42 |
| 3,647,420 A | 3/1972 | Restelll .................. 75/84 |
| 3,926,832 A | 12/1975 | Barosi .................. 252/181.6 |
| 3,956,975 A | 5/1976 | Egleston et al. .................. 93/49 M |
| 4,032,328 A | 6/1977 | Hurd .................. 75/84.1 |
| 4,070,765 A | 1/1978 | Hovmand et al. .................. 34/10 |
| 4,126,493 A | 11/1978 | Wurm .................. 148/20 |
| 4,141,783 A | 2/1979 | Pisecky et al. .................. 159/4 S |
| 4,190,963 A | 3/1980 | Christensen et al. .................. 34/57 A |
| 4,201,798 A | 5/1980 | Lindmayer .................. 427/74 |
| 4,281,024 A | 7/1981 | Hauberg et al. .................. 426/471 |
| 4,303,200 A | 12/1981 | Hansen .................. 239/223 |
| 4,305,210 A | 12/1981 | Christensen et al. .................. 34/57 |
| 4,406,699 A | 9/1983 | Beck et al. .................. 75/233 |
| 4,428,856 A | 1/1984 | Boyarina et al. .................. 252/181.1 |
| RE32,064 E | 1/1986 | Nielsen .................. 239/224 |
| 4,722,756 A | 2/1988 | Hard .................. 148/126 |
| 4,733,821 A | 3/1988 | Jensen et al. .................. 239/224 |
| 4,748,737 A | 6/1988 | Charles et al. .................. 29/599 |
| 4,885,848 A | 12/1989 | Christensen .................. 34/57 R |
| 4,923,531 A | 5/1990 | Fisher .................. 148/126.1 |
| 4,960,471 A | 10/1990 | Fife et al. .................. 148/20.3 |
| 5,013,357 A | 5/1991 | Worcester et al. .................. 75/622 |
| 5,022,164 A | 6/1991 | Hansen et al. .................. 34/57 B |
| 5,022,935 A | 6/1991 | Fisher .................. 148/126.1 |
| 5,030,400 A | 7/1991 | Danielsen et al. .................. 264/101 |
| 5,100,509 A | 3/1992 | Pisecky et al. .................. 159/4.2 |
| 5,133,137 A | 7/1992 | Petersen .................. 34/57 A |
| 5,171,379 A | 12/1992 | Kumar et al. .................. 148/422 |
| 5,211,741 A | 5/1993 | Fife .................. 7/255 |
| 5,223,088 A | 6/1993 | Hansen .................. 159/2.1 |
| 5,245,514 A | 9/1993 | Fife et al. .................. 361/529 |
| 5,248,387 A | 9/1993 | Hansen .................. 159/481 |
| 5,284,531 A | 2/1994 | Fife .................. 148/513 |
| 5,412,533 A | 5/1995 | Murayama et al. .................. 361/528 |
| 5,448,447 A | 9/1995 | Chang .................. 361/529 |
| 5,607,649 A | 3/1997 | Hansen .................. 422/147 |
| 5,615,493 A | 4/1997 | Funder .................. 34/583 |
| 5,632,100 A | 5/1997 | Hansen .................. 34/374 |
| 5,648,118 A | 7/1997 | Liborius .................. 427/213 |
| 5,817,280 A | 10/1998 | Larsen et al. .................. 422/143 |
| 5,825,611 A | 10/1998 | Pozdeev .................. 361/524 |
| 5,839,207 A | 11/1998 | Christensen et al. .................. 34/369 |
| 5,993,513 A | 11/1999 | Fife .................. 75/743 |
| 6,001,281 A | 12/1999 | Lessner et al. .................. 252/500 |
| 6,007,597 A | 12/1999 | Puopolo et al. .................. 75/10.14 |
| 6,051,044 A | 4/2000 | Fife .................. 75/229 |
| 6,051,326 A | 4/2000 | Fife .................. 428/610 |
| 6,056,899 A | 5/2000 | Lessner et al. .................. 252/518.1 |
| 6,058,624 A | 5/2000 | Bach et al. .................. 34/374 |
| 6,072,694 A | 6/2000 | Hahn et al. .................. 361/523 |
| 6,098,895 A | 8/2000 | Walzel et al. .................. 239/7 |
| 6,151,798 A | 11/2000 | Petersen .................. 34/304 |
| 6,165,623 A * | 12/2000 | Fife et al. .................. 428/472 |
| 6,215,652 B1 * | 4/2001 | Yoshida et al. .................. 361/524 |

(List continued on next page.)

FOREIGN PATENT DOCUMENTS

| | | |
|---|---|---|
| AU | 104631 | 8/1937 |
| EP | 0 634 761 A1 | 1/1995 |

(List continued on next page.)

OTHER PUBLICATIONS

International Search Report for PCT/US01/47054, month/year not available.

(List continued on next page.)

Primary Examiner—Bruce F. Bell

(57) ABSTRACT

Pressed material such as anodes are described and formed from oxygen reduced oxide powders using additives, such as binders and/or lubricants. Methods to form the pressed material are also described, such as with the use of atomizing, spray drying, fluid bed processing, microencapsulation, and/or coacervation.

27 Claims, No Drawings

U.S. PATENT DOCUMENTS

| | | | |
|---|---|---|---|
| 6,243,255 B1 * | 6/2001 | Kuge et al. | 361/528 |
| 6,253,463 B1 | 7/2001 | Hansen | 34/362 |
| 6,322,912 B1 | 11/2001 | Fife | 428/702 |
| 6,338,816 B1 * | 1/2002 | Fife | 419/13 |
| 6,373,685 B1 * | 4/2002 | Kimmel et al. | 361/508 |
| 6,375,704 B1 * | 4/2002 | Habecker et al. | 75/229 |
| 6,391,275 B1 * | 5/2002 | Fife | 423/592 |
| 6,402,066 B1 * | 6/2002 | Habecker et al. | 241/21 |
| 6,416,730 B1 * | 7/2002 | Fife | 423/592 |
| 6,420,043 B1 * | 7/2002 | Fife et al. | 428/472 |
| 6,462,934 B2 * | 10/2002 | Kimmel et al. | 361/508 |

FOREIGN PATENT DOCUMENTS

| | | |
|---|---|---|
| EP | 0 634 762 A1 | 1/1995 |
| GB | 485318 | 5/1938 |
| GB | 489742 | 8/1938 |
| GB | 835316 | 5/1960 |
| WO | WO 85/05288 | 12/1985 |
| WO | WO 98/30348 | 7/1998 |
| WO | WO 00/14139 | 12/1999 |
| WO | WO 00/12783 | 3/2000 |
| WO | WO 00/14755 | 3/2000 |
| WO | WO 00/15555 | 3/2000 |
| WO | WO 00/15556 | 3/2000 |
| WO | WO 00/28559 | 5/2000 |
| WO | WO 00/19469 | 6/2000 |
| WO | WO 00/44068 | 7/2000 |
| WO | WO 00/45472 | 8/2000 |
| WO | WO 00/46818 | 8/2000 |
| WO | WO 00/56486 | 9/2000 |

OTHER PUBLICATIONS

Abstract Document No. 129:284714, 1998, no month.
Abstract Document No. 129:130191, 1998, no month.
Abstract Document No. 128:288971, 1998, no month.
Abstract Document No. 85:170443, 1976, no month.
Abstract Document No. 83:140466, 1975, no month.
Abstract Document No. 104:229152, 1986, no month.
Abstract Document No. 104:198128, 1986, no month.
Abstract Document No. 108:122980, 1988, no month.
Abstract Document No. 104:42412, 1987, no month.
Abstract Document No. 110:224093, 1989, no month.
Abstract Document No. 109:103212, 1988, no month.
Abstract Document No. 116:199338, 1992, no month.
Abstract Document No. 113:10823, 1990, no month.
Abstract Document No. 120:179957, 1994, no month.
Abstract Document No. 119:84165, 1993, no month.
Abstract Document No. 118:86049, 1993, no month.
Acrivos, et al., "Dynamic phenomena in superconducting oxides measured by ESR" Phys. Rev. B: Condens. Matter, 50(18), pp. 12710–12723. no month/year available.
Acrivos, et al., "Dynamics of Flux Motion..." Physica C (Amsterdam) 234–40(Pt. 5), pp. 3159–3160. (1994) no month available.
Bauer, George, "The Oxides of Niobium," Zeitschrift fuer anorgamische und allgemeine Chemie, vol. 248, No. 1, (Sep. 1941) (w/ full English Translation).
Feschotte, et al., "Niobium Physico–Chemical Properties Of TTS Compounds and Alloys" Atomic Energy Review, Special Issue No. 2. International Atomic Energy Agency – Vienna (1968), pp. 57–59. no month available.
International Search Report for International Application PCT/US97/19949 mailed Mar. 18, 1998.
International Search Report for PCT/US99/21413 mailed Sep. 16, 1999.
Kuz'micheves, et al., "Superconductivity in lathanide–strontium–niobium–oxide system" Zh. Neorg. Khim 38(1), pp. 162–166 (with full English translation) no month/year available.
Mellor "Inorganic and Theoretical Chemistry" vol. IX, pp. 856–857, no date.
pp. 59, 65, and 66 of "Encyclopedia of Chemical Technology," vol. 17, 4$^{th}$ Edition, no date.
Vest et al., "Electrical Conductivity in Ceramics and Glass" Department of the Air Force, Aerospace Research Laboratories Wright–Patterson Air Force Base, Ohio. pp. 375–384. (1974).
Young article, pp. 4 and 5 of Chapter 2, no date, no citation.
U.S. Patent Application No. 09/154,452.
U.S. Patent Application No. 09/347,990.
U.S. Patent Application No. 09/533,430.
U.S. Patent Application No. 09/758,705.
U.S. Patent Application No. 09/816,689.

* cited by examiner

MODIFIED OXYGEN REDUCED VALVE METAL OXIDES

This application claims the benefit under 35 U.S.C. §119(e) of prior U.S. Provisional Patent Application No. 60/246,042 filed Nov. 6, 2000, which is incorporated in its entirety by reference herein.

BACKGROUND OF THE INVENTION

The present invention relates to valve metal oxides and more particularly relates to modified oxygen reduced valve metal oxides and methods to prepare the same.

Powders, such as those used as capacitor powders, can typically have poor agglomeration properties which creates problems when the powder needs to be pressed into an anode, for instance.

Other times, powders can have poor flow properties or can have high surface hardness such that the pressing equipment used to press the powders is significantly worn by the surface of the powders. Thus, additives are used with the powders in order to modify the particle surface and thus improve the agglomeration of the particles, increase the flowability of the powders, minimize the wear on the processing equipment, enhance or not degrade post-pressing compact strength, and/or permit the easy removal of the compacted powder. With tantalum metal powders, certain additives may be used to primarily minimize wear since the industry has developed ways to produce agglomerated powders that have acceptable flow and crush strength. With valve metal oxides, such as oxygen reduced niobium oxides, (e.g. NbO), this material is a ceramic-type material with a high surface hardness compared to metals. The ceramic chemistry does not typically allow the rapid sintering to produce agglomerates used in metal processing and the diffusion behavior of ceramics is quite different than metals. Thus, the oxygen reduced valve metal oxides such as oxygen reduced niobium oxides need to be modified in order to provide the proper properties needed to form more commercially acceptable capacitor anodes.

SUMMARY OF THE PRESENT INVENTION

A feature of the present invention is to provide oxygen reduced valve metal oxides that overcome one or more of the above-described difficulties.

A further feature of the present invention is to provide oxygen reduced valve metal oxides that form into capacitor anodes with more beneficial properties.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to modified oxygen reduced valve metal oxides. The modified oxygen reduced valve metal oxides are preferably coated with at least one additive in order to promote or enhance the processing of the oxygen reduced valve metal oxide in the formation of a capacitor anode.

Preferably, the oxygen reduced valve metal oxide is an oxygen reduced niobium oxide and more preferably contains at least NbO. The additive that is coated onto at least a portion of the surfaces of the oxygen reduced valve metal oxides is preferably a binder or lubricant and more preferably is a binder or lubricant capable of promoting one or more beneficial properties in the formation of a capacitor anode such as good pressability, good flowability, minimizing the wear on pressing equipment, enhance agglomeration of the oxygen reduced valve metal oxides, and the like.

The present invention further relates to a method of forming the modified oxygen reduced valve metal oxides and includes the step of coating at least a portion of the surfaces of the oxygen reduced valve metal oxides with an additive that promotes or enhances the formation of capacitor anodes from the oxygen reduced valve metal oxides. A preferred additive is at least one binder. The coating of the oxygen reduced valve metal oxides can be done a number of ways including spray drying, fluid bed processing, coating by a precipitation or chemical reaction process, or physical mixing of the valve metal oxides with the appropriate additives.

The present invention further relates to capacitor anodes formed from the above-identified modified valve metal oxides.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention relates to oxygen reduced valve metal oxides and further relates to methods of making the same and also relates to capacitor anodes containing the modified oxygen reduced valve metal oxides. In general, the modified oxygen reduced valve metal oxides are oxygen reduced valve metal oxides that are in the presence of at least one additive. Preferably, at least a portion of the surfaces of the oxygen reduced valve metal oxides are coated with at least one additive. More preferably, substantially the entire surface of the oxygen reduced valve metal oxides are coated with at least one additive. As an example, preferably at least 10% of the surface area of the oxygen reduced valve metal oxides are coated with at least one additive and more preferably at least 25% of the surface area, and even more preferably at least 50% of the surface area. Most preferably, at least 75%, or at least 85%, or least 95%, or even 99% or 100%, of the surface area of the oxygen reduced valve metal oxides is coated with at least one additive as described herein.

With respect to the oxygen reduced valve metal oxides, the details of the oxygen reduced valve metal oxides are set forth in the following patents, patent applications, and publications, all of which are incorporated in their entirety by reference herein and form a part of the present application: Ser. No. 09/154,452 filed Sep. 16, 1998; Ser. No. 09/347,990 filed Jul. 6, 1999; Ser. No. 09/533,430 filed Mar. 23, 2000; No. 60/229,668 filed Sep. 1, 2000; Ser. No. 09/758,705 filed Jan. 11, 2001; No. 60/246,042 filed Nov. 6, 2000; Ser. No. 09/816,689 filed Mar. 23, 2001; and PCT Published Application No. WO 00/15556.

Preferably, the oxygen reduced valve metal oxide is a oxygen reduced niobium oxide. Other oxygen reduced valve metal oxides include, but are not limited to, oxygen reduced aluminum oxide, tantalum oxide, titanium oxide, zirconium oxide, vanadium oxide, or combinations thereof.

The shape or size of the oxygen reduced valve metal oxide can be any shape or size. Preferably, the oxygen reduced valve metal oxide is in the form of a powder with a plurality of different size particles. Examples of the type of powders that can be used include, but are not limited to, flaked, angular, nodular, and mixtures or variations thereof. The details of the groups of particles and sizes as mentioned in the above-identified patent and publications can be used in the present application.

The oxygen reduced valve metal oxides can also contain levels of nitrogen, e.g., from about 100 ppm to about 80,000 ppm $N_2$ or to about 130,000 ppm $N_2$. Suitable ranges includes from about 31,000 ppm $N_2$ to about 130,000 ppm $N_2$ and from about 50,000 ppm $N_2$ to about 80,000 $N_2$. Other dopants can also be used.

Preferably, the oxygen reduced valve metal oxide is any valve metal oxide which has a lower oxygen content in the metal oxide compared to the starting valve metal oxide. Typical oxygen reduced niobium oxides comprise NbO, $NbO_{0.7}$, $NbO_{1.1}$, $NbO_2$, and any combination thereof with or without other oxides present. Generally, the reduced niobium oxide of the present invention has an atomic ratio of niobium to oxygen of about 1:less than 2.5, and preferably 1:2 and more preferably 1:1.1, 1:1, or 1:0.7. Put another way, the reduced niobium oxide preferably has the formula $Nb_xO_y$, wherein Nb is niobium, x is 2 or less, and y is less than 2.5x. More preferably x is 1 and y is less than 2, such as 1.1, 1.0, 0.7, and the like. This would also preferably apply to other oxygen reduced valve metal oxides.

The oxygen reduced valve metal oxides of the present invention also preferably have a microporous surface and preferably have a sponge-like structure, wherein the primary particles are preferably 1 micron or less. The oxygen reduced valve metal oxides of the present invention can have high specific surface area, and a porous structure with approximately 50% porosity. Further, the oxygen reduced valve metal oxides of the present invention can be characterized as having a preferred specific surface area of from about 0.5 or lower to about 10.0 $m^2/g$ or higher, more preferably from about 0.5 to 2.0 $m^2/g$, and even more preferably from about 1.0 to about 1.5 $m^2/g$. The preferred apparent density of the powder of the valve metal oxides is less than about 2.0 g/cc, more preferably, less than 1.5 g/cc and more preferably, from about 0.5 to about 1.5 g/cc.

The various oxygen reduced valve metal oxides of the present invention can be further characterized by the electrical properties resulting from the formation of a capacitor anode using the oxygen reduced valve metal oxides of the present invention. In general, the oxygen reduced valve metal oxides of the present invention can be tested for electrical properties by pressing powders of the oxygen reduced valve metal oxides into an anode and sintering the pressed powder at appropriate temperatures and then anodizing the anode to produce an electrolytic capacitor anode which can then be subsequently tested for electrical properties.

Accordingly, another embodiment of the present invention relates to anodes for capacitors formed from the modified oxygen reduced valve metal oxides of the present invention. Anodes can be made from the powdered form of the reduced oxides in a similar process as used for fabricating metal anodes, i.e., pressing porous pellets with embedded lead wires or other connectors followed by optional sintering and anodizing. The lead connector can be embedded or attached at any time before anodizing. Anodes made from some of the oxygen reduced valve metal oxides of the present invention can have a capacitance of from about 1,000 CV/g or lower to about 300,000 CV/g or more, and other ranges of capacitance can be from about 20,000 CV/g to about 300,000 CV/g or from about 62,000 CV/g to about 200,000 CV/g and preferably from about 60,000 to about 150,000 CV/g. In forming the capacitor anodes of the present invention, a sintering temperature can be used which will permit the formation of a capacitor anode having the desired properties. The sintering temperature will be based on the oxygen reduced valve metal oxide used. Preferably, the sintering temperature is from about 1000° C. or lower to about 1750° C. and more preferably from about 1200° C. to about 1400° C. and most preferably from about 1250° C. to about 1350° C. when the oxygen reduced valve metal oxide is an oxygen reduced niobium oxide.

The anodes formed from the valve metal oxides of the present invention are preferably formed at a voltage of about 35 volts and preferably from about 6 to about 70 volts. When an oxygen reduced niobium oxide is used, preferably, the forming voltages are from about 6 to about 50 volts, and more preferably from about 10 or less to about 40 volts or more. Other high formation voltages can be used such as from about 70 volts or less to about 130 volts or more. The DC leakage achieved by the valve metal oxides of the present invention have provided excellent low leakage at high formation voltages. This low leakage is significantly better than capacitors formed with Nb powder. Also, the anodes formed from the oxygen reduced valve metal oxides of the present invention preferably have a DC leakage of less than about 5.0 nA/CV. In an embodiment of the present invention, the anodes formed from some of the oxygen reduced valve metal oxides of the present invention have a DC leakage of from about 5.0 nA/CV to about 0.10 nA/CV.

The present invention also relates to a capacitor in accordance with the present invention having an oxide film on the surface of the capacitor. Preferably, the film is a niobium pentoxide film for oxygen reduced niobium oxides. The means of making metal powder into capacitor anodes is known to those skilled in the art and such methods such as those set forth in U.S. Pat. Nos. 4,805,074, 5,412,533, 5,211,741, and 5,245,514, and European Application Nos. 0 634 762 A1 and 0 634 761 A1, all of which are incorporated in their entirety herein by reference.

The capacitors of the present invention can be used in a variety of end uses such as automotive electronics, cellular phones, computers, such as monitors, mother boards, and the like, consumer electronics including TVs and CRTs, printers/copiers, power supplies, modems, computer notebooks, disc drives, and the like.

With respect to the anodes formed from the niobium oxides of the present invention, preferably, the valve metal oxide powder is mixed with an additive, such as a binder and/or lubricant solution in an amount sufficient to be able to form the valve metal oxide powder into an anode when pressed. Preferably, the amount of the binder and/or lubricant in the powder ranges from about 1 to about 20 wt %, based on the wt % of the combined ingredients. After mixing the valve metal oxide powder with the binder and/or lubricant solution, the solvent that may be present as part of the binder/lubricant solution is removed by evaporation or other drying techniques. Once the solvent, if present, is removed, the valve metal oxide powder is then pressed into the shape of an anode, preferably with a tantalum, niobium, or other conductive wire embedded in the anode. While a variety of press densities can be used, preferably, the pressed density is from about 2.5 to about 4.5 g/cc. Once pressed into the anode, a de-binding or de-lube step occurs to remove the binder and/or lubricant present in the pressed anode. The removal of the binder and/or lubricant can occur a number of ways including putting the anode in a vacuum furnace at temperatures, for instance, of from about 250° C. to about 1200° C. to thermally decompose the binder and/or lubricant. The binder and/or lubricant can also be removed by other steps such as repeated washings in appropriate solvents to dissolve and/or solubilize, or otherwise remove the binder and/or lubricant that may be present. Once the de-binding/de-lube step is accomplished, the anode is then sintered in a vacuum or under inert atmosphere at appropriate sintering temperatures, such as from about 900° C. to about 1900° C. The finished anode then preferably has reasonable body and/or wire pull strength as well as low carbon residue. The anodes of the present invention have numerous advantages over tantalum and/or niobium powders which are formed into anodes. Many organic binders and/or lubricants which are used to improve press performance in the formation of an anode lead to high carbon residues which are present after de-binding or de-lubing and sintering. The full removal of the carbon residue can be extremely difficult since carbon forms carbides with metals. The presence of carbon/carbides leads to the formation of defective dielectrics and thus an undesirable product. With the anodes of the present invention, the micro-environment of the anode is oxygen-rich. Thus, when the anode is sintered at high temperature, carbon residue in the anodes can evaporate as carbon monoxide after reacting with oxygen. Thus, the anodes of the present invention have a "self-cleaning" property which is quite different from other anodes formed from tantalum or niobium. Accordingly, the anodes of the present invention have a high tolerance of organic impurities during processing and handling and have the ability to use a wide range of hydrocarbon containing binders and/or lubricants for improved processability including improved powder flow, improved anode green strength, and the like. Accordingly, the binders and/or lubricants that can be used in the present invention include organic binders and organic lubricants as well as binders and lubricants that contain high amounts of hydrocarbons. Examples of suitable binders that can be used in the formation of the pressed anodes of the present invention, include, but are not limited to, poly(propylene carbonates) such as QPAC-40 available from PAC Polymers, Inc., Greenville, Del.; alkyd resin solutions, such as GLYPTAL 1202 available from Glyptal Inc., Chelsea, Mass.; polyethylene glycols, such as CARBOWAX, available from Union Carbide, Houston, Tex.; polyvinylalcohols, stearic acids, ammonium carbonate, camphor, polypropylene oxide, and the like. The procedures and additional examples of binders and/or lubricants set forth in Publication Nos. WO 98/30348; WO 00/45472; WO 00/44068; WO 00/28559; WO 00/46818; WO 00/19469; WO 00/14755; WO 00/14139; and WO 00/12783; and U.S. Pat. Nos. 6,072,694; 6,056,899; and 6,001,281, all of which are incorporated in their entirety by reference herein, can be used in the present invention.

With respect to the incorporation of the at least one additive, such as the binder and/or lubricant, the present invention includes the use of spray drying or other hardening processes. Other methods to incorporate the binder and/or lubricant include fluid bed processing, the physical mixing of the particles with the additives, coating by precipitation or chemical reaction processes, microencapsulation processes, and the like.

In more detail, with respect to spray drying or hardening processes, these processes involve a slurry of particles, binders, dispersants, and other adjuvants that are combined with a solvent such as water or light organic material, and then passed through a device that causes it to atomize into droplets of a controlled size distribution. These droplets are then cooled, hardened via chemical reaction, or formed via evaporation of the solvent, into particles. These particles may be used as is, or subject to additional treatment to obtain the desired characteristics. The final particle size distribution is controllable by a combination of the distribution emerging from the spray mechanism, the materials in the feed mixture, and the degree of particle agglomeration created by the conditions within the process equipment. This distribution can range from individual particles up to agglomerates of several hundred particles or more. This is typically a one step process, but multiple treatments, potentially with different coating compositions can be used. The potential variations in the process include air flow, temperature, relative flow of air versus particle, and the like.

With respect to a fluid bed process, this process involves particles, either directly from the oxygen reduced valve metal oxide production process or from a previous treatment step, that are subjected to a combination of heat treatment, chemical reaction, or physical coating. This process can result in a modification of the surface of the particle, as well as agglomeration, similar to that described above. A spray process can be followed by a fluid bed treatment to further modify the product.

Alternatively, the particles can be physically mixed with coating or modification materials. This would be a mechanical process rather than the air suspension processes described above and could have multiple steps involving several layers of materials.

The particles can be coated via a precipitation or chemical reaction process while the particles are suspended in a fluid, sometimes called coacervation. For instance, oil can be first emulsified in water and then urea-formaldehyde resin is added. By adjusting the properties of the solvent, oil, and resin, the polymer settles at the interface between the oil and water. Subsequent addition of a polymerization initiator causes the resin to harden around the oil and form a discrete particle.

Microencapsulation can also be used, which is broadly defined as any process that creates an impervious or barrier coating between the particle, or agglomeration of many particles. All of the processes discussed above, plus others, can be used to create a barrier coating.

The techniques, devices, and methods described in the following patents can be used in the present inventions and form a part of the present invention and are incorporated in their entirety by reference herein: U.S. Pat. Nos. 6,253,463; 6,151,798; 6,098,895; 6,058,624; 5,839,207; 5,817,280; 5,648,118; 5,632,100; 5,615,493; 5,607,649; 5,248,387; 5,223,088; 5,133,137; 5,100,509; 5030,400; 5,022,164; 4,885,848; 4,733,821; RE32,064; U.S. Pat. Nos. 4,305,210; 4,303,200; 4,281,024; 4,190,963; 4,141,783; 4,070,765; and 3,956,975. Equipment commercially available from Niro can be used.

One or more of the following property modifications may be achieved from coating or modifying the particles:

Improved "green strength" or crush strength of an initially formed anode. This is can be done by adding materials that increases the coefficient of friction between particles, improve adhesion, or allow for physical interference between the particles. This may also be done by agglomerating particles. The added materials must be easy to remove via washing or pyrolysis to a level that does not interfere with downstream processing or the electrical properties of the capacitor.

Improved flow properties. Coating or agglomerating the particles can improve the degree of slip and flow, resulting in faster, more predictable processing.

Protection of product properties during processing. A coating could be used to protect the surface of the product from air or other contaminants or reactants until a certain point in the capacitor formation process. A specific example would be a barrier coating that restricts oxygen from getting to a high CV/high surface area particle that could be subject to self-ignition.

Creating agglomerated particles of a specific composition or particle size distribution. Agglomeration in a controlled process allows for the creation of uniform composition on a very small scale. It could be advantageous to have an unusual size distribution that could not be kept uniform during normal handling, or it might be useful to have a very specific combination of ingredients that offered improved capacitor properties.

Placing a coating on the surface of the particle that reacts or activates during the capacitor production process to modify the properties of the material. An example would be a coating that regulated the rate or extent of oxygen migration from the MnO2 cathode material, thus improving the consistency of the manganazation process. Another example would be a material that reduced the surface tension within the pores of an anode and allows the MnO2 to flow more consistently into the pores. This particular example would apply more as the average particle size decreases and/or the size of the anode increases as both circumstances lead to more difficult manganazation.

Creating agglomerates that are already filled with MnO2 or cathodization material, so that the production of the capacitor is simplified by only having to force cathode material into a small number of channels.

The present invention will be further clarified by the following examples, which are intended to be exemplary of the present invention.

TEST METHODS

Anode Fabrication:
   size—0.197" dia
   3.5 Dp
   powder wt=341 mg
Anode Sintering:
   1300° C. 10"
   1450° C. 10"
   1600° C. 10"
   1750° C. 10"
30V Ef Anodization:
   30V Ef @ 60° C./0.1% $H_3PO_4$ Electrolyte
   20 mA/g constant current
DC Leakage/Capacitance—ESR Testing:
   DC Leakage Testing—
      70% Ef (21 VDC) Test Voltage
      60 second charge time
      10% $H_3PO_4$ @ 21° C.
   Capacitance—DF Testing:
      18% $H_2SO_4$ @ 21° C.
      120 Hz
50V Ef Reform Anodization:
   50V Ef @ 60° C./0.1% $H_3PO_4$ Electrolyte
   20 mA/g constant current
   DC Leakage/Capacitance—ESR Testing:
      DC leakage Testing—
         70% Ef (35 VDC) Test Voltage
         60 second charge time
         10% $H_3PO_4$ @ 21° C.
      Capacitance—DF Testing:
         18% $H_2SO_4$ @ 21° C.
         120 Hz
75V Ef Reform Anodization:
   75V Ef @ 60 C/0.1% $H_3PO_4$ Electrolyte
   20 mA/g constant current
   DC Leakage/Capacitance—ESR Testing:
      DC leakage Testing—
         70% Ef (52.5 VDC) Test Voltage
         60 second charge time
         10% $H_3PO_4$ @ 21° C.
      Capacitance—DF Testing:
         18% $H_2SO_4$ @ 21° C.
         120 Hz Scott Density, oxygen analysis, phosphorus analysis, and BET analysis were determined according to the procedures set forth in U.S. Pat. Nos. 5,011,742; 4,960,471; and 4,964,906, all incorporated hereby in their entireties by reference herein. All percents, unless stated otherwise, are wt % based on the total weight of mixture. Flow rate was determined according to the procedure set forth in International Published Application No. WO 99/61184, incorporated in its entirety by reference herein.

EXAMPLES

Example 1

Spray Drying Using Polyethylene Glycol

In this experiment, 12.5 lbs of de-ionized water, 0.25 lbs of Darvan 821A(ammonium polyacrylate solution (75% $H_2O$)) and 0.25 lbs of trimethylamine were added to a mixing tank with a Cowles type agitator. The slurry was agitated with the Cowles agitator for 5 minutes until completely homogeneous. 25 lbs of NbO powder lot NBO-8580-84 with a mean particle size of approximately 10.5 microns was added to the tank. The mixture was agitated for 10 minutes until the NbO powder was evenly dispersed. Next, 0.75 lbs of PEG 8000(polyethylene glycol) was added to the mixing tank. The slurry was agitated for a minimum 10 minutes prior to spray drying to ensure even dispersion. Agitation of the tank was maintained until the tank was emptied during spray drying.

A 6-ft in diameter Niro dryer was used for the drying portion of the experiment. The tank containing the slurry was moved into the appropriate position and attached via piping to the laboratory spray dryer system. The mixing tank was continuously agitated until the tank was empty. The slurry was pumped through the top of the dryer and into the atomizer at a rate of 1.5 lb/minute. A Niro rotator type atomizer rotating at 5000 rpm dispersed the material outward in the Niro drying chamber. A heated stream of air flowed through the dryer at a constant rate sufficient to dry the material before it reaches the bottom of the dryer. The temperature of the air inside the dryer was approximately 350 C as measured by a thermocouple located 2 ft below the top of the dryer.

The dried material was separated into 2 portions during the drying process. The largest material was collected at the bottom of the dryer due to the weight of the particles. The material collected in the bottom of the dryer represented 90% of the starting solid material by weight. Particles that remained suspended in air were carried into a cyclone for further separation. 7% of the starting solid material by weight was collected in the cyclone. This cyclone was designed to collect particles that are approximately 5 micron in diameter or larger. Based on the weights of the material collected in the bottom of the dryer and the cyclone, 1% of the initial solids was removed in the air waste stream or accumulated on the dryer walls. Both portions of the collected material were kept separate for individual evaluation.

Example 1 Product Evaluation

Sample Description

| Sample ID | Scott Density (g/in$^3$) | Crush @ 3.2 g/cc Press density | Description based on evaluation in a 30 ml glass jar. |
|---|---|---|---|
| NBO-8580-84 | 14.0 | 3.29 lbs | Non-free flowing powder, tends to cake on the bottom of the jar. |
| NBO-8580-84-PEG | 10.7 | 2.76 lbs | Non-free flowing powder, tends to cake and stick on the sides and bottom of the jar. All material <90 microns as tested by screening. |
| NBO-858-84-PEGC | 10.6 | 3.33 lbs | Non-free flowing powder, tends to cake on the bottom of the jar. All material <90 microns as tested by screening. |

NBO-8580-84 Raw NbO powder
NBO-8580-84-PEG Dryer collected material
NBO-8580-84-PEGC Cyclone collected material Example 2
Spray Drying Using Poly(Vinyl Alcohol)

In this experiment, 12.5 lbs of de-ionized water, 0.25 lbs of Darvan 821A(ammonium polyacrylate solution (75% H$_2$O)) and 0.25 lbs of trimethylamine were added to a mixing tank with a Cowles type agitator. The slurry was agitated with the Cowles agitator for 5 minutes until completely homogeneous. 25 lbs of NbO powder lot NBO-8580-84 with a mean particle size of approximately 10.5 microns was added to the tank. The mixture was agitated for 10 minutes until the NbO powder was evenly dispersed. Next, 0.75 lbs of PVA(poly(vinyl alcohol) 100% hydrolized, 85,000–140,000 molecular weight) was added to the mixing tank. The slurry was agitated for a minimum 10 minutes prior to spray drying to ensure even dispersion. Agitation of the tank was maintained until the tank was emptied during spray drying.

A 6-ft in diameter Niro dryer was used for the drying portion of the experiment. The tank containing the slurry was moved into the appropriate position and attached via piping to the laboratory spray dryer system. The mixing tank was continuously agitated until the tank was empty. The slurry was pumped through the top of the dryer and into the atomizer at a rate of 1.5 lb/minute. A Niro rotator type atomizer rotating at 5000 rpm dispersed the material outward in the Niro drying chamber. A heated stream of air flowed through the dryer at a constant rate sufficient to dry the material before it reaches the bottom of the dryer. The temperature of the air inside the dryer was approximately 350 C as measured by a thermocouple located 2 ft below the top of the dryer.

The dried material was separated into 2 portions during the drying process. The largest material was collected at the bottom of the dryer due to the weight of the particles. The material collected in the bottom of the dryer represented 90% of the starting solid material by weight. Particles that remained suspended in air were carried into a cyclone for further separation. 7% of the starting solid material by weight was collected in the cyclone. This cyclone was designed to collect particles that are approximately 5 micron in diameter or larger. Based on the weights of the material collected in the bottom of the dryer and the cyclone, 1% of the initial solids was removed in the air waste stream or accumulated on the dryer walls. Both portions of the collected material were kept separate for individual evaluation.

Example 2 Product Evaluation

Sample Description

| Sample ID | Scott Density (g/in$^3$) | Description based on evaluation in a 30 ml glass jar. |
|---|---|---|
| NBO-8580-84 | 14.0 | Non-free flowing powder, tends to cake on the bottom of the jar. |
| NBO-8580-84-PVA | 12.8 | Free flowing powder when rotated in the jar, defined agglomerates visually observed |
| NBO-858-84-PVAC | 11.8 | Free flowing powder when rotated in the jar, agglomerates less defined than in NBO-8580-84-PVA |

NBO-8580-84 Raw NbO powder
NBO-8580-84-PVA Dryer collected material
NBO-8580-84-PVAC Cyclone collected material Example 3
Melt Coating NbO with PEG 8000

In this experiment, 10 g of NbO lot 8651-3-54S with a mean particle size of 1.84 microns and 4 g of PEG 8000 (polyethylene glycol) were added to a metal beaker. The metal beaker was attached to an agitator shaft and the shaft was inserted into an air powered mixer. The beaker and agitator were tilted to approximately a 45° angle. The bottom of the beaker rested on top of a piece of Teflon inside a metal water bath which was sitting on a hot plate. The metal pan was filled ¾ full with water which covered the bottom ⅓ of the beaker. The agitator was turned on and the beaker rotated in the water bath at approximately 60 rpm. This rate of agitation was maintained throughout this experiment. The hot plate was turned on and the water bath was heated to 95° C. The beaker was heated to a minimum 80° C. The heat to the system was turned off, and the beaker was allowed to cool while continuing to rotate at approximately 60 rpm. The temperature of the beaker was monitored using an infrared thermometer. Below 35° C., agitation was stopped and the powder was removed from the beaker and screened to less than 50 US mesh(300 micron), but greater than 100 US mesh(150 micron).

Example 3 Product Evaluation

Sample Description

| Sample ID | Scott Density (g/in$^3$) | Crush @ 3.5 g/cc Press density | Flow based on Characterization Test Lab Die Fill Evaluation |
|---|---|---|---|
| NBO-8651-54S | 21.6 | 3.13 lbs | Flow = 0 mg/s |
| NBO-8651-54P4 | 26.8 | 5.33 lbs | Flow = 270 mg/s. |

NBO-8651-3-54S Raw NbO powder
NBO-8651-3-54P4 NbO lubed with 4% PEG

Example 4
Coating NbO with QPAC 40A (double screening procedure)

In this experiment, 18 g of QPAC 40A(poly(propylene carbonate)) was dissolved in a metal beaker in 300 ml of acetone. After the QPAC 40A was completely dissolved, 600 g of NbO powder lot NBO-C-8656-14 with a mean particle size of 10.09 microns was gradually added to the beaker while stirring continuously with a metal spatula. The mixture was continuously stirred using until the acetone was almost completely evaporated and the powder appears only slightly damp. The slightly damp powder was pressed through a 20 US mesh screen(850 micron) using a spatula. The screened power was dried completely in a vacuum oven. The dried powder was screened through a 40 US mesh screen (425 micron). The screened material was submitted for evaluation.

Example 4 Product Evaluation
Sample Description

| Sample ID | Scott Density (g/in$^3$) | Crush @ 3.2 g/cc Press density | Flow based on Characterization Test Lab Die Fill Evaluation |
|---|---|---|---|
| NBO-C-8656-14 | 14.0 | 3.63 lbs | Flow = 0 mg/s |
| NBO-Q-8656-14-701 | 17.2 | 6.42 lbs | Flow = 61 mg/s. |

NBO-C-8656-14 Raw NbO powder
NBO-Q-8656-14-701 NbO lubed with 3% QPAC 40A

Example 5
Coating NbO with QPAC 40A(Single Screening Procedure)

In this experiment, 18 g of QPAC 40A(poly(propylene carbonate)) was dissolved in a metal beaker in 300 ml of acetone. After the QPAC 40A was completely dissolved, 600 g of NbO powder lot NBO-C-8656-14 with a mean particle size of 10.09 microns was gradually added to the beaker while stirring continuously with a metal spatula. The mixture was continuously stirred using until the acetone was completely evaporated. The powder was dried completely in a vacuum oven. The dried powder was screened through a 50 US mesh screen (300 micron). The screened material was submitted for evaluation.

Example 5 Product Evaluation
Sample Description

| Sample ID | Scott Density (g/in$^3$) | Crush @ 3.2 g/cc Press density | Flow based on Characterization Test Lab Die Fill Evaluation |
|---|---|---|---|
| NBO-C-8656-14 | 14.0 | 3.63 lbs | Flow = 0 mg/s |
| NBO-C-8656-14-Q3 | 17.3 | 3.97 lbs | Flow = 20 mg/s. |

NBO-C-8656-14 Raw NbO powder
NBO-C-8656-14-Q3 NbO lubed with 3% QPAC 40A

Example 6
Melt Coating NbO with Stearic Acid

In this experiment, NbO lot NBO-C-8656-14 with a mean particle size of 10.09 microns was mixed with 0.5%, 2.0% and 4.0% stearic acid. Each mixture was added to a metal beaker. The metal beaker was attached to an agitator shaft and the shaft was inserted into an air powered mixer. The beaker and agitator were tilted to approximately a 45° angle. The bottom of the beaker rested on top of a piece of Teflon inside a metal water bath which was sitting on a hot plate. The metal pan was filled ¾ full with water which covered the bottom ⅓ of the beaker. The agitator was turned on and the beaker rotated in the water bath at approximately 60 rpm. This rate of agitation was maintained throughout this experiment. The hot plate was turned on and the water bath was heated to 95° C. The beaker was heated to a minimum 85° C. The heat to the system was turned off, and the beaker was allowed to cool while continuing to rotate at approximately 60 rpm. The temperature of the beaker was monitored using an infrared thermometer. Below 35° C., agitation was stopped and the powder was removed from the beaker and screened to less than 50 US mesh(300 micron).

Example 6 Product Evaluation
Sample Description

| Sample ID | Scott Density (g/in$^3$) | Crush @ 3.5 g/cc Press density | Flow based on Characterization Test Lab Die Fill Evaluation |
|---|---|---|---|
| NBO-C-8656-14 | 14.0 | 3.63 lbs | Flow = 0 mg/s |
| NBO-SA-8656-14-804 | 21.3 | 1.39 lbs | Flow = 28 mg/s |
| NBO-SA-8656-14-802-1 | 21.5 | 0.79 | Flow = 3 mg/s. |
| NBO-SA-8656-14-701 | 19.1 | Not Tested | Flow = 3 mg/s. |

NBO-C-8656-14 Raw NbO powder
NBO-SA-8656-14-804 NbO lubed with 4% Stearic Acid
NBO-SA-8656-14-802-1 NbO lubed with 2% Stearic Acid
NBO-SA-8656-14-701 NbO lubed with 0.5% Stearic Acid Example 7
Melt Coating Nb Flattened Particles with PEG 8000

In this experiment, 100 g Nb metal lot 8580-81-8, which was Nb metal that was flattened into particles with a BET of 1.81 m$^2$/g during a mechanical operation, and 3 g by weight PEG 8000(polyethylene glycol) were added to a metal beaker. The metal beaker was attached to an agitator shaft and the shaft was inserted into an air powered mixer. The beaker and agitator were tilted to approximately a 450 angle. The bottom of the beaker rested on top of a piece of Teflon inside a metal water bath which was sitting on a hot plate. The metal pan was filled ¾ full with water which covered the bottom ⅓ of the beaker. The agitator was turned on and the beaker rotated in the water bath at approximately 60 rpm. This rate of agitation was maintained throughout this experiment. The hot plate was turned on and the water bath was heated to 95° C. The beaker was heated to a minimum 80° C. The heat to the system was turned off, and the beaker was allowed to cool while continuing to rotate at approximately 60 rpm. The temperature of the beaker was monitored using an infrared thermometer. Below 35° C., agitation was stopped and the powder was removed from the beaker and screened to less than 50 US mesh(300 micron).

Example 7 Product Evaluation
Sample Description

| Sample ID | Scott Density (g/in$^3$) | Description based on evaluation in a 30 ml glass jar. |
|---|---|---|
| NBDF-8580-81-8 | 13.1 | Non-free flowing powder, tends to cake on the bottom of the jar. |
| NBDF-8580-81-8P | 15.0 | Material appeared slightly damp with a variety of agglomerate sizes formed. Material flowed better than the raw powder when the jar was rotated. |

NBDF-8580-81-8 Raw NbO powder
NBDF-8580-81-8P Nb flattened particles lubed with 3% PEG

Example 8
Coating NbO with PEG 8000

In this experiment, 4 g of PEG 8000(polyethylene glycol) was dissolved in a metal beaker in approximately 200 ml of water. After the PEG 8000 was completely dissolved, 100 g of NbO powder lot NBO-8656-16 with a mean particle size of 10.77 microns was gradually added to the beaker while stirring continuously with a metal spatula. The mixture was continuously stirred using until the water was almost completely evaporated and the powder appears damp. The damp powder was dried in a vacuum oven. The dried powder was screened through a 50 US mesh screen (300 micron). The screened material was submitted for evaluation.

Example 8 Product Evaluation
Sample Description

| Sample ID | Flow based on Characterization Test Lab Die Fill Evaluation |
|---|---|
| NBO-8656-8 | Flow = 0 mg/s |
| NBO-PE-8656-16-P4 | Flow = 52 mg/s. |

NBO-8656-16 Raw NbO powder
NBO-PE-8656-16-P4 NbO lubed with 4% PEG 8000

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims and equivalents thereof.

What is claimed is:

1. A method of forming an anode comprising the steps of pressing a mixture comprising oxygen reduced niobium oxide powder and at least one binder or lubricant or both to form a pressed anode, wherein said mixture is prepared by coating said oxygen reduced niobium oxide powder with said binder and/or lubricant.

2. The method of claim 1, wherein said coating is accomplished by atomizing said mixture into droplets.

3. The method of claim 1, wherein said coating is accomplished by spray drying said mixture.

4. The method of claim 1, wherein said coating is accomplished by fluid bed processing.

5. The method of claim 1, wherein said coating is accomplished by coacervation.

6. The method of claim 1, wherein said coating is accomplished by microencapsulation.

7. The method of claim 1, wherein said oxygen reduced niobium oxide has an atomic ratio of niobium to oxygen of 1:less than 2.5.

8. The method of claim 1, wherein said niobium oxide is NbO.

9. The method of claim 1, wherein said niobium oxide comprises NbO, $NbO_{0.7}$, $NbO_{1.1}$, or combinations thereof.

10. The method of claim 1, further comprising de-binding or de-lubing the binder or lubricant.

11. The method of claim 10, wherein said de-binding or de-lubing is accomplished by thermally decomposing said binder or lubricant.

12. The method of claim 10, wherein said de-binding or de-lubing is accomplished by repeated washings in at least one solvent capable of removing said binder or lubricant.

13. The method of claim 10, further comprising sintering the anode in a vacuum or under an inert atmosphere.

14. The method of claim 1, wherein said binder or lubricant comprises an organic binder or lubricant.

15. The method of claim 1, wherein said binder or lubricant comprises poly(propylene carbonate), alkyd resin solution, polyethylene glycol, polyvinyl alcohol, stearic acid, ammonium carbonate, camphor, polypropylene oxide, or combinations thereof.

16. A pressed anode formed from the process of claim 1.

17. The pressed anode of claim 16, wherein said anode has a low carbon residue after removal of the binder or lubricant and after sintering.

18. A method of forming an anode comprising the steps of pressing a mixture comprising oxygen reduced valve metal oxide powder and at least one binder or lubricant or both to form a pressed anode, wherein said mixture is prepared by coating said oxygen reduced valve metal oxide powder with said binder and/or lubricant.

19. The method of claim 18, wherein said coating is accomplished by atomizing said mixture into droplets.

20. The method of claim 18, wherein said coating is accomplished by spray drying said mixture.

21. The method of claim 18, wherein said coating is accomplished by fluid bed processing.

22. The method of claim 18, wherein said coating is accomplished by coacervation.

23. The method of claim 18, wherein said coating is accomplished by microencapsulation.

24. The method of claim 18, wherein said oxygen reduced valve metal oxide comprises oxygen reduced tantalum oxide, oxygen reduced aluminum oxide, oxygen reduced titanium oxide, oxygen reduced zirconium oxide, alloys thereof or combinations thereof.

25. The method of claim 18, wherein said oxygen reduced valve metal oxide has an atomic ratio of valve metal to oxygen of 1:less than 2.5.

26. A pressed anode formed from the process of claim 18.

27. A method of forming an agglomerated product comprising the steps of agglomerating a mixture comprising an oxygen reduced valve metal oxide powder and at least one additive to form an agglomerated product, wherein said mixture is prepared by coating said oxygen reduced valve metal oxide powder with said additive.

* * * * *